US008211559B1

(12) United States Patent
Waggoner

(10) Patent No.: US 8,211,559 B1
(45) Date of Patent: Jul. 3, 2012

(54) METHOD AND SYSTEM FOR DETECTING LEAKAGE OF ENERGY STORAGE STRUCTURE LIQUID

(75) Inventor: Susan Marie Waggoner, Loogootee, IN (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 1160 days.

(21) Appl. No.: 12/023,218

(22) Filed: Jan. 31, 2008

(51) Int. Cl.
*H01M 10/48* (2006.01)
*H01M 2/02* (2006.01)
*G01R 27/00* (2006.01)

(52) U.S. Cl. ........ 429/90; 429/176; 73/49.3; 340/636.1; 324/691

(58) Field of Classification Search .................. None
See application file for complete search history.

(56) References Cited

U.S. PATENT DOCUMENTS

| | | | |
|---|---|---|---|
| 4,135,384 A | | 1/1979 | Burwell, Jr. et al. |
| 5,824,883 A | * | 10/1998 | Park et al. ........................ 73/40 |
| 7,042,235 B2 | | 5/2006 | Strackbein et al. |
| 2006/0134511 A1 | | 6/2006 | Ito et al. |

FOREIGN PATENT DOCUMENTS

JP          5-109436     *    4/1993

OTHER PUBLICATIONS

Machine translation of JP 05-109436, Apr. 1993.*

* cited by examiner

*Primary Examiner* — Jonathan Crepeau
(74) *Attorney, Agent, or Firm* — Christopher A. Monsey

(57) ABSTRACT

A method and system for detecting liquid leaked from an energy storage structure, e.g., a battery is provided. One embodiment includes a sensor that detects the leaked electrolyte as it leaks through a breach in the wall retaining the electrolyte in the battery. The sensor has a sheet-like layer with a conductive surface and an electrical connection to a first interface. The sensor is positioned substantially flush to the battery wall, so that leaking electrolyte contacts the sensor. If the battery has a case, there is a first external communication point in electrical communication with the first interface. In the absence of leaked electrolyte there is substantially no electrical connection between the first external communication point and either of the terminals as indicated by a very high resistance. When leaked electrolyte is present there is an electrical connection between the first external communication point and either of the terminals.

48 Claims, 7 Drawing Sheets

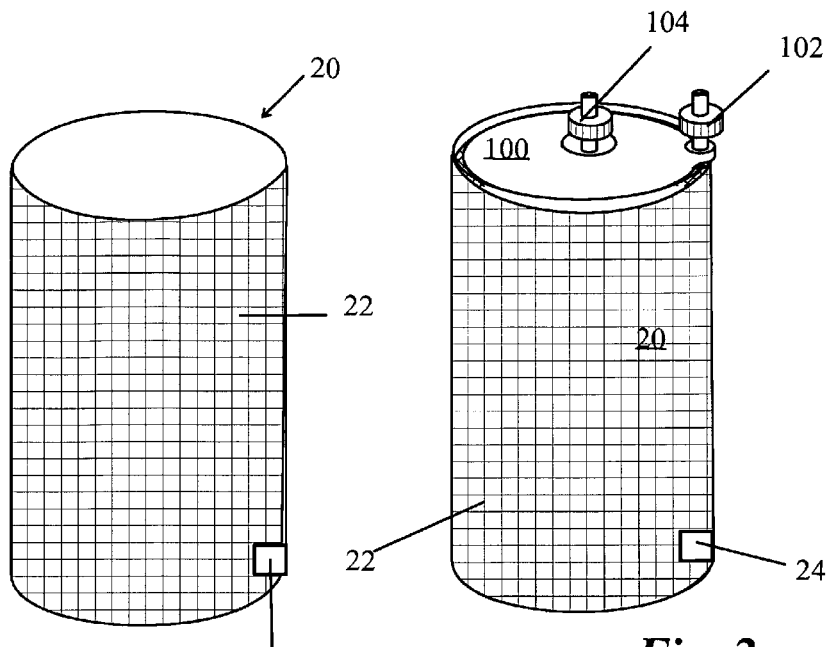
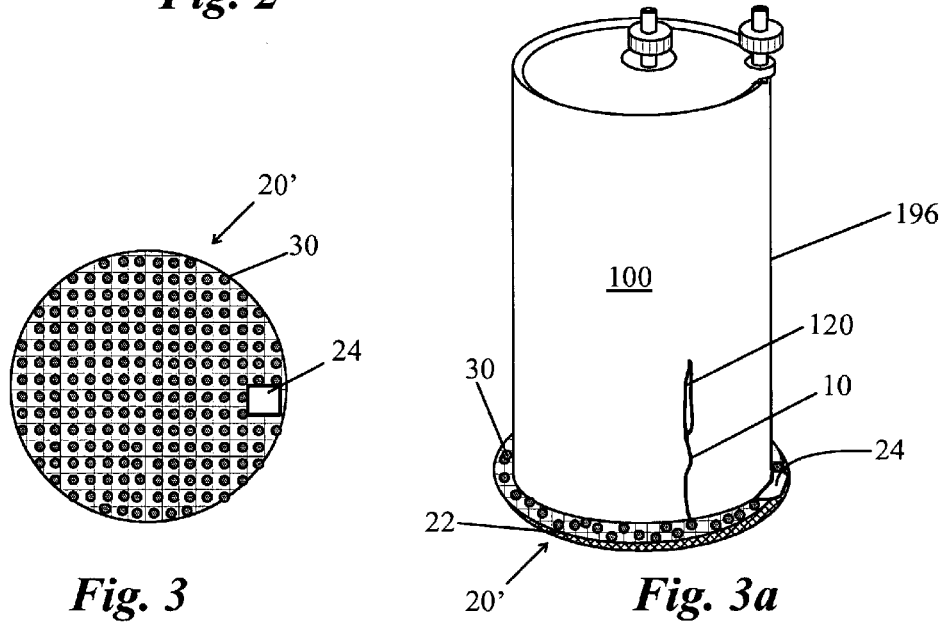
*Fig. 2*  *Fig. 2a*
*Fig. 3*  *Fig. 3a*

METHOD AND SYSTEM FOR DETECTING LEAKAGE OF ENERGY STORAGE STRUCTURE LIQUID

STATEMENT OF GOVERNMENT INTEREST

The invention described herein was made in the performance of official duties by an employee of the Department of the Navy and may be manufactured, used, licensed by or for the United States Government for any governmental purpose without payment of any royalties thereon.

FIELD OF THE INVENTION

The present invention relates generally to energy storage systems, and more particularly to a system for detecting leakage of electrolyte from batteries.

BACKGROUND

Cracked cells or monoblocks cause electrolyte to leak through the wall into the battery case. Electrolyte can also leak if the battery is overcharged, as the overcharging can cause the electrolyte to spew out of the cells or monoblocks. Leaked electrolyte corrodes the battery case, and it is particularly corrosive to metal battery cases and the trays securing the battery, as well as adjacent equipment.

SUMMARY OF THE INVENTION

A method and system is provided for detecting liquid leaks, such as for example electrolyte leaked from a first structure adapted to store a liquid used in an energy storage system, for example a battery. One embodiment of the system comprises a second structure that serves as a sensor that detects electrolyte as it leaks through a breach in a battery wall retaining the electrolyte or when it spews out of a battery cap and drips down to the sensor. The second structure is positioned in proximity to a surface of the first structure. A first conductor is coupled to a first area of the second structure. The leak detection system includes a connectable sensing system adapted to sense a change in at least one electrical value associated with at least one area of the second structure, where the sensing system is coupled or connectable to the first conductor. The second structure is adapted such that an electrical value associated with the second structure will change when at least some of the liquid comes in contact with the second structure.

An embodiment of a method associated with the invention tests the conductivity between terminals coupled to each liquid permeable layer, and the method works irregardless of the electrical values or measurements of the battery case. The system is suited to easily and rapidly check for the presence of leaked electrolyte with the battery in place, and lends itself to automation and hierarchical network testing. This embodiment of the invention also potentially lends itself to determining the size of the breach, as the larger the opening the less resistance through the breach.

BRIEF DESCRIPTION OF THE DRAWINGS

The foregoing invention will become readily apparent by referring to the following detailed description and the appended drawings in which:

FIG. 2 is a perspective side view of one embodiment of a battery electrolyte leak detector sensor having a conductive layer, an absorbent layer for collecting leaked electrolyte in contact with the conductive layer and an electrical terminal coupled to the conductive layer and is adapted to partially or totally enclose and be placed in proximity to one or more side walls of a battery;

FIG. 2a is a perspective side view of the sensor illustrated in FIG. 2 with a battery within the sensor enclosure;

FIG. 3 is a planar view of another embodiment of an electrolyte leak detector sensor with a conductive layer and an absorbent layer for detecting electrolyte from a battery, wherein the interstices and the bottom side of a pad-like sensor are filled with an absorbent for collecting leaked electrolyte;

FIG. 3a is a perspective side view of the sensor illustrated in FIG. 3, wherein the battery is seated on the pad-like sensor, and electrolyte is leaking through a tear in the wall of the cellular battery;

DETAILED DESCRIPTION OF THE INVENTION

An electrolyte detection system and method is provided for a variety of battery types. If the battery has a conductive case, then the detection system typically requires a sensor with an insulating layer.

Figure 1:
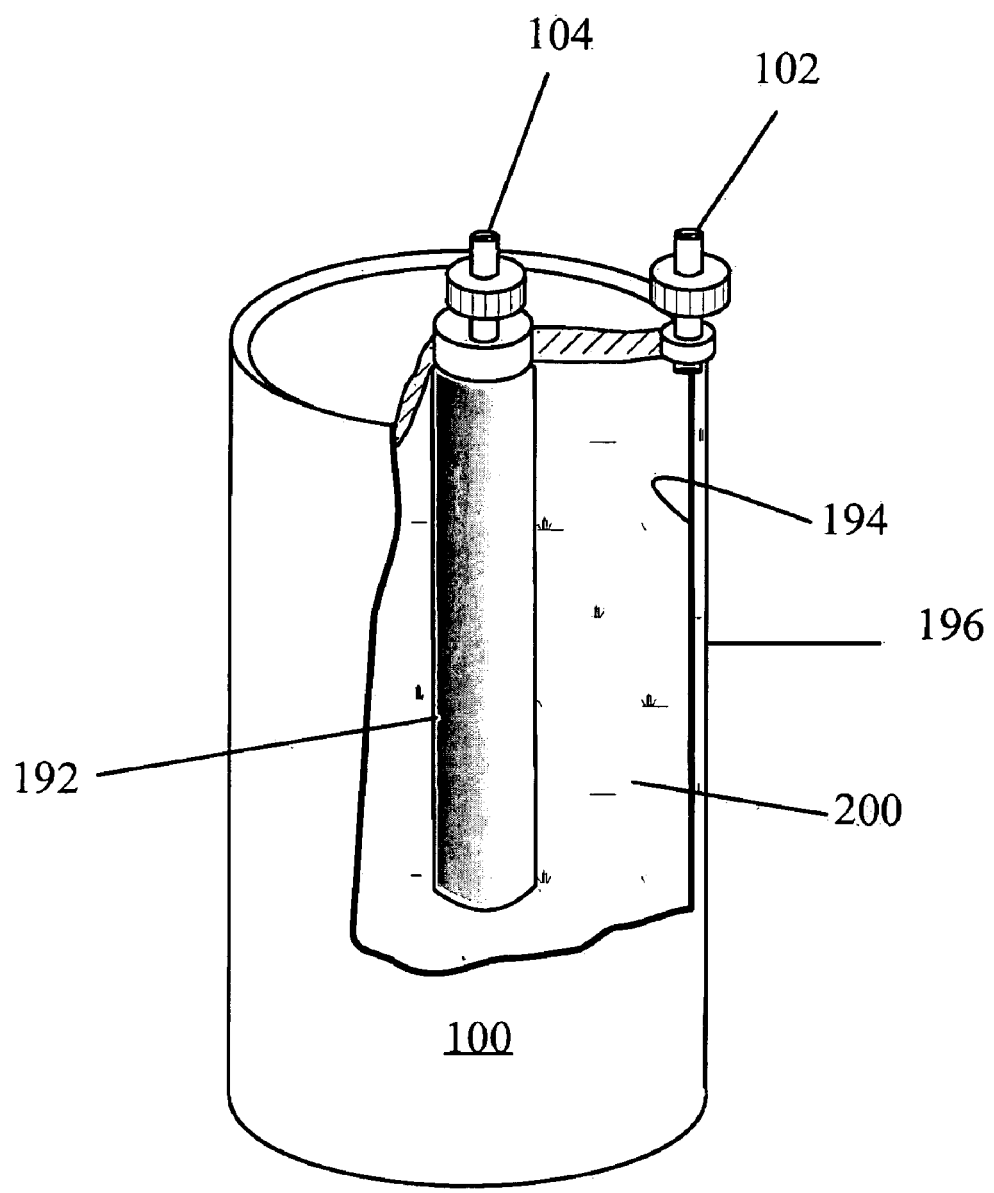
FIG. 1 is a side cutaway view of a dry cell battery.

One example of a dry cell battery is shown in FIG. 1 having a cathode 192 with a positive terminal 104, an anode 194 with a negative terminal 102, an electrolyte 200 and an insular wall 196. In the illustrated battery 100, the anode 194 is a cylindrical layer of zinc, and the electrolyte 200 is typically a moist paste of ammonium chloride, zinc chloride and fillers. The cathode 192 can be carbon coated with manganese oxide. The insular wall 196 is comprised of a paper layer, and as the zinc is consumed the electrolyte moves closer and closer to the paper layer, and toward the end of the battery's life, it is common for the electrolyte to tear the wall and for electrolyte to leak out. It should be noted that an embodiment of the invention can be adapted for use with any type of liquid encapsulating a system associated with energy storage.

FIGS. 2-3a show several embodiments of the invention for detecting and mitigating damage caused by leaking electrical storage system liquids, including electrolyte. A sleeve-like sensor 20 is illustrated in FIG. 2. The sensor 20 has a sheet-like layer with a conductive surface 22, and can be made from a foil sheet, layer, perforated foil sheet, a mesh, a grid of wires, a conductive pad, or a combination thereof. A shape for the sheet-like layer can be formed to ensure the conductive surface is substantially flush to a battery external surface, and is adapted to ensure contact with leaked electrolyte or liquid as it leaks out of the battery's external surface, such as a side wall. FIG. 2a illustrates the battery 100 covered with a leak sensor (e.g., FIG. 2, sensor 20) in accordance with an embodiment of the invention. The sensor has an electrical interface 24 that can be coupled with a multimeter or another electrical value or measurement test device to detect changes in electrical values or measurements associated with the sensor to include determining the resistance between one of the terminals 104, 102 and the first interface 24. For example, if resistance measured between two points in the sensor or between the first interface 24 and terminals 104 or 102 is very high, there is substantially an open circuit, as there is no conductive path (i.e. leaked electrolyte) between a terminal and the first interface. A lower resistance indicates that electrolyte has leaked.

In FIG. 3, sensor 20' includes an absorbent permeable layer 30 that collects leaked electrolyte and a sheet-like layer with a conductive surface, wherein the sensor 20' prevents or impedes damage or corrosion to adjacent equipment or structures from electrolyte (not shown) leaked from an energy storage device. The sheet-like layer can be in contact with or proximity to a container having a liquid used in an energy storage system, such as a battery containing electrolyte, such that the liquid is detected after it leaks from the container. Referring to FIG. 3a, battery 100 is shown with a rupture 120 in a wall 196, and electrolyte 10 leaking down onto a pad-like sensor 20' having an absorbent layer 30. In this embodiment the sensor can be flush or not flush against an energy storage structure, e.g. a battery, side wall 196; however, sensors not flush with a battery wall may be somewhat slower to detect the electrolyte than a sleeve-like embodiment illustrated in FIG. 2.

Figure 4:
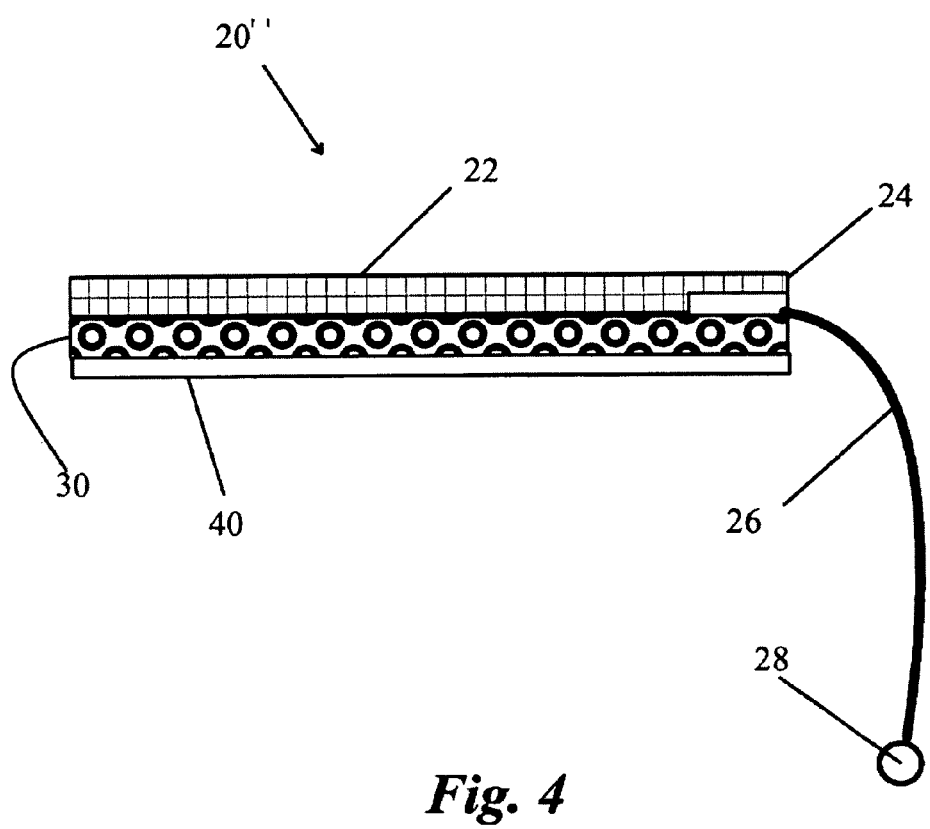
FIG. 4 is a side view showing another embodiment of a pad-like sensor for detecting an electrolyte leak from a battery, wherein the top layer is an electrically conductive grid, the middle layer is an absorbent for collecting leaked electrolyte, and the bottom layer is a nonconductive layer.

FIG. 4 illustrates a sensor 20" that has a sheet-like layer with a conductive surface 22 with a first interface 24, an absorbent layer 30 that collects leaked liquid, e.g. electrolyte, and an electrically and physically insulating layer as well as a conductor 26 having coupling 28 which can be connected to an electrical value measuring device or another conductor. The absorbent layer 30 and the conductive layer 22 each have distinct electrical values associated with a state without leaked electrolyte in contact with at least one of the layers. The conductivity of the absorbent layer 30 increases as more electrolyte is absorbed, while the electrical value of the conductive layer 22 is substantially conductive or nonconductive, depending on whether electrolyte is in contact with an area or surface of the absorbent layer 30. An electrical path can be detected between a point within the energy storage device containing electrolyte and the sensor 20" by means of detecting changes in electrical values which occur when a leak of electrolyte occurs. Other electrical value measurements related to the sensor 20" and an energy storage structure the sensor is placed in proximity with such as, for example, resistance values, can also vary when liquid leaked from the energy storage structure comes into contact with the sensor 20". The insulating layer would be useful in a sleeve-like version of a leak sensor, such as shown in FIG. 2, as it provides a protective layer between the battery and a user of a battery, trapping electrolyte between the insulating layer 40 and the battery wall.

Figure 5:
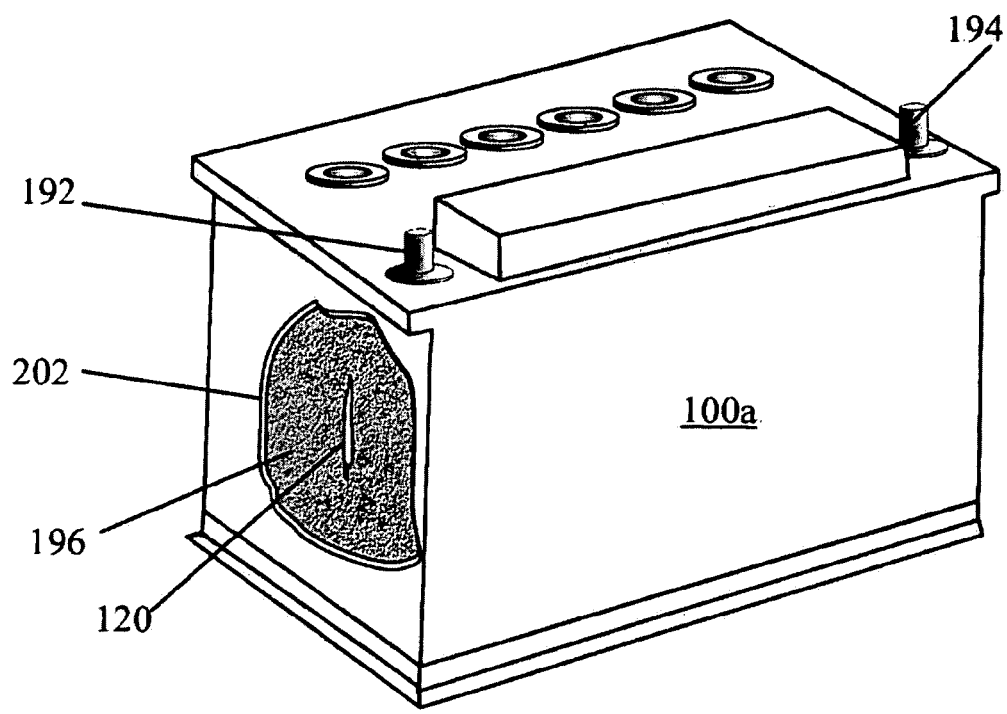
FIG. 5 is a side cutaway perspective view of a monoblock lead acid battery having a case, where the cutaway view through an outer case wall illustrates a breach in a monolayer wall of the battery.

FIG. 5 illustrates a lead acid battery 100a. The case 202 is cut away revealing the wall 196 which has an aperture or rupture 120, through which sulfuric acid can leak. The battery case of a lead acid battery 100a and other monoblock batteries can be made of a polymeric material selected to be nonconductive, or made of metal, and therefore conductive. The battery 100a has electrodes 192, 194 adapted for use in charging or discharging the battery 100a. If a battery case is conductive, the case 202 can carry a current, and electrolyte that breaches the wall 196 causes the battery to drain down. If sufficient acid leaks, irrespective of the type of case, the cell will be dry and substantially nonconductive.

Figure 6:
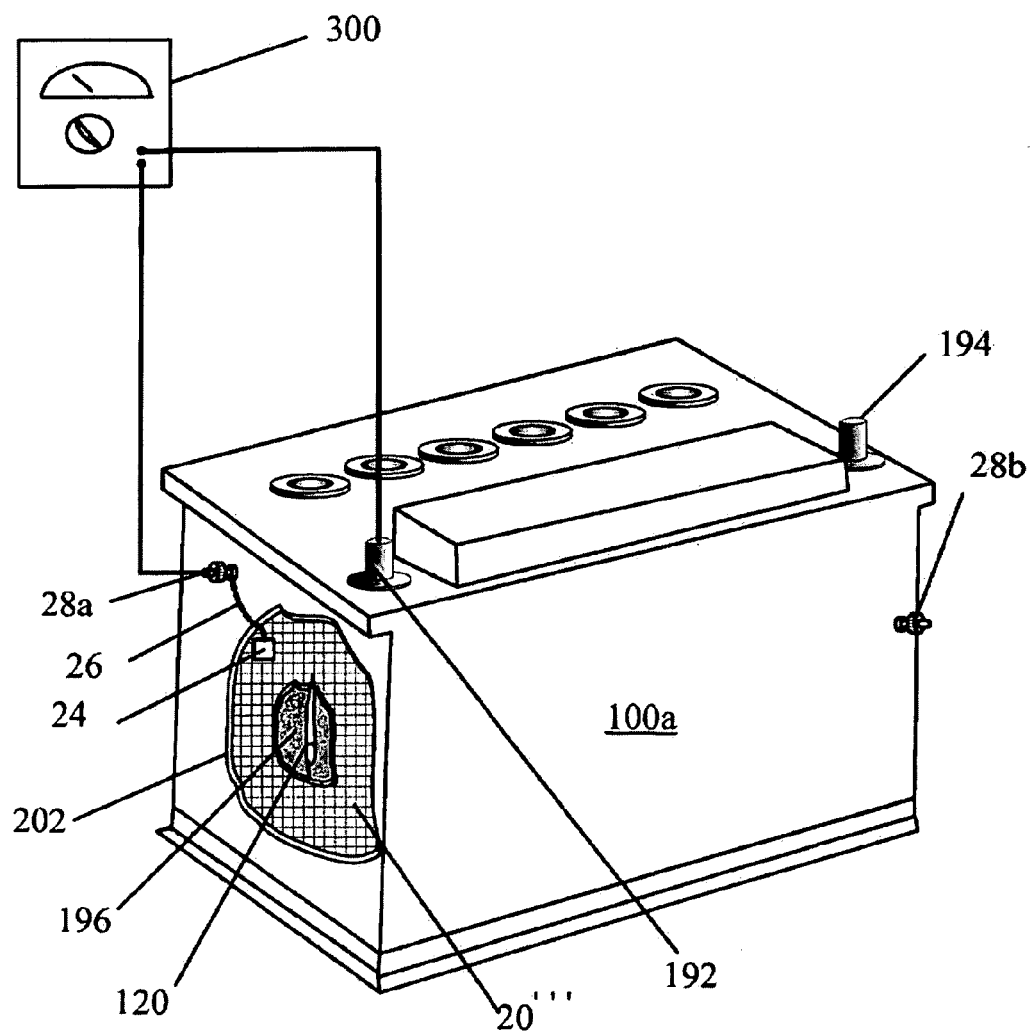
FIG. 6 is a side cutaway perspective view of the lead acid battery illustrated in FIG. 5 fitted with an electrolyte detector system, wherein the battery has a sensor (also shown cutaway) between an outer wall and an insular case containing electrolyte, and a first external communication point in electrical communication with an interface point coupled with the sensor; and a second external communication point, which can include a second sensor or a redundant second external communication point, wherein a multimeter is connected between an electrode of the battery and the first external communication point.

FIG. 6 illustrates a lead acid battery fitted with an embodiment of the invention for detecting electrolyte. The battery monoblock walls are substantially flush to the conductive surface of the sensor 20''', such that the sensor contacts the leaked electrolyte as it leaks out of the one or more cells or monoblocks. The sensor's sheet-like conductive surface layer provides an electrical conductive path to the leaked electrolyte and an electrical connection to a first interface when leaked electrolyte comes into contact with the sensor 20'''. A first external communication point 28a is in electrical communication with the first interface 24 through the first conductive element 26 (e.g., an electrical wire). In the illustrated embodiment, the conductive surface layer is cut away to enable the reader to see underlying slit or rupture 120 in the wall 196. The battery case of illustrated lead acid battery 100a is nonconductive, and therefore no insulating layer is required, but optionally could be included. If the case were conductive, then the sensor would have an electrically and physically insulating layer between the layer having a conductive surface and the battery's case 202.

Referring to FIG. 6, leakage can be determined by testing the connection between the first external communication point 28a and the terminal 192, using for instance a multimeter 300. Alternatively, multimeter 300 can be coupled with another terminal, e.g., 194, of the battery. Note in the illustrated embodiment, the battery 100a has a second communication point 28b. The second communication point 28b could be a redundant connection to the sensor, or the battery could have a plurality of corresponding sensors, for instance one on each side of the battery. The communication point 28 is illustrated as protruding; however, it could alternatively be recessed (e.g., a receptacle that accepts plugs or prongs), thereby preventing accidental contact with equipment or personnel. The corresponding sensor has a corresponding communication point. The plurality of corresponding sensors would enable each side wall to be tested individually in order to isolate where the wall had failed. This capability could be utilized in engineering new batteries and in analyzing flaws in a manufacturing process.

Figure 7:
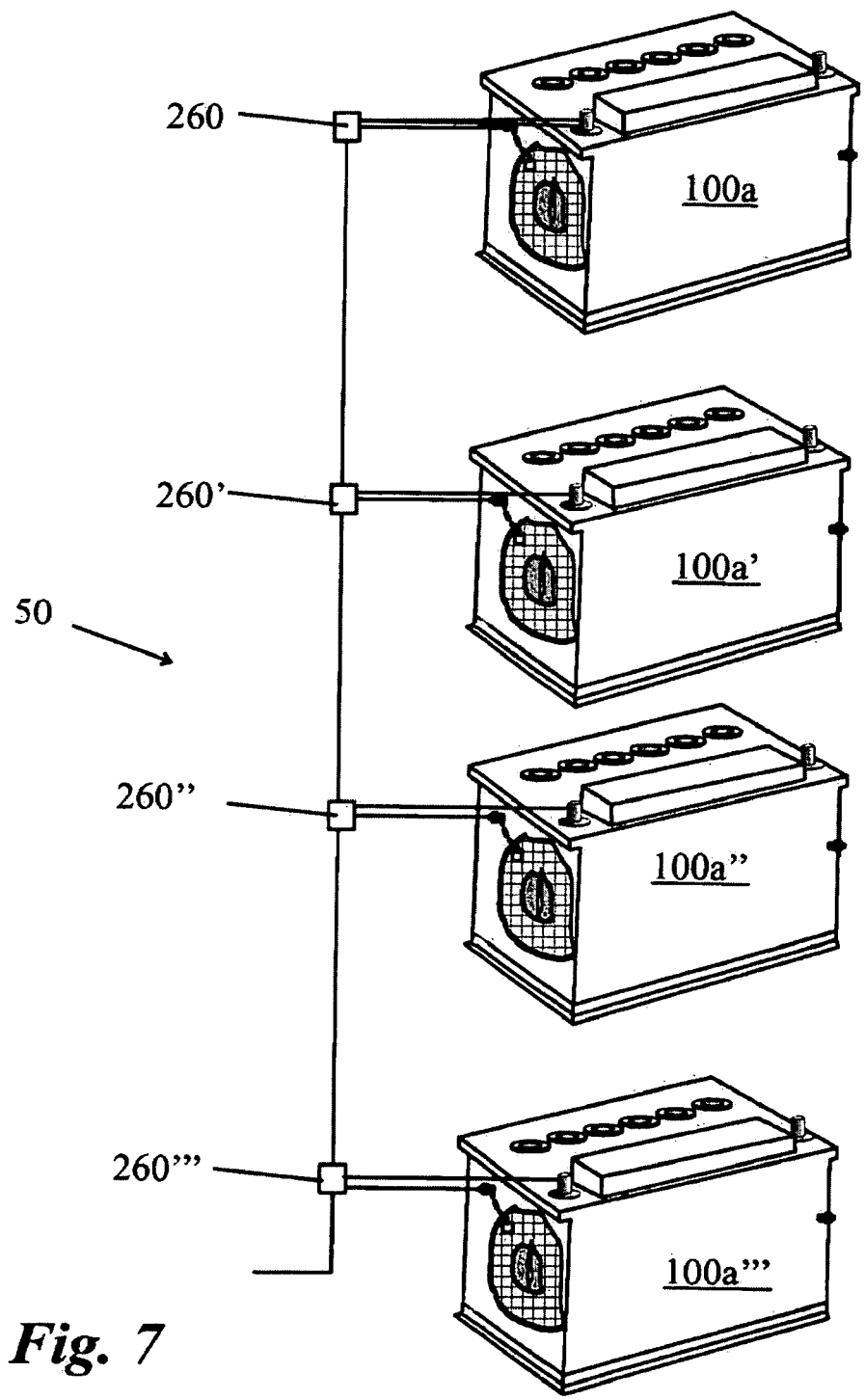
FIG. 7 is a diagrammatic view of a network of batteries, wherein the sensor and a terminal of each battery are in electrical communication with a controller on a network bus, such as an I2C bus, therein allowing remote analysis of multiple batteries.

FIG. 7 illustrates a network 50 of batteries 100a, 100a', 100a'', and 100a'''. The individual batteries are in electrical communication with a controller 260, 260', 260'', and 260''' on a network bus, such as an I2C bus, therein allowing remote analysis of multiple batteries. A microprocessor would typically sample the sensors on the batteries and relay the information to a processor. The microprocessor could further comprise a transmitter that communicates readings to the processor or other digital device that calculates the electrical values or measurements and thereby measures the electrical values or measurements and therefore the presence or absence of leaked electrolyte.

Figure 8:
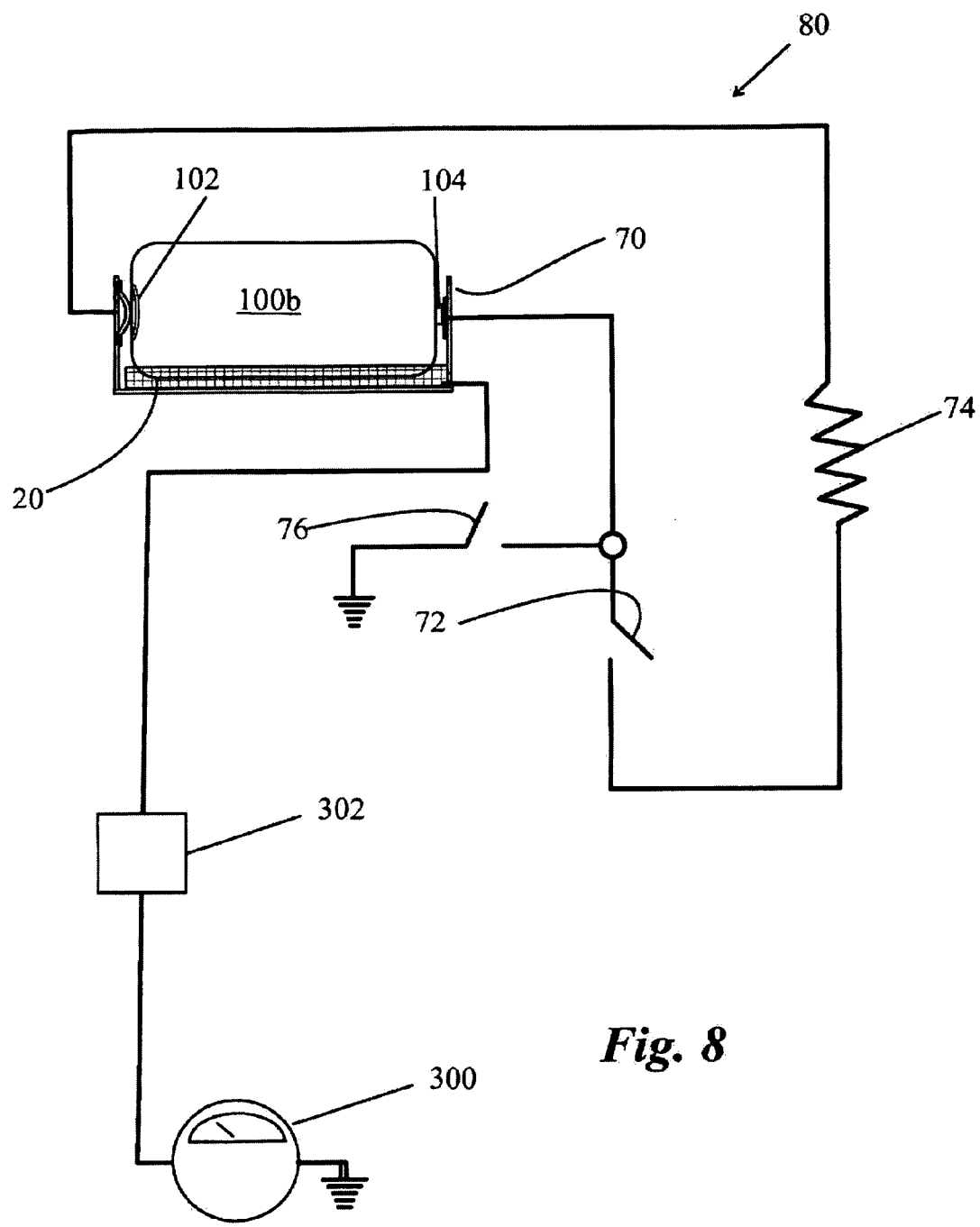
FIG. 8 is a diagrammatic view of one embodiment of the invention where a common commercial battery is seated in a holder/shelf fitted with a sensor to detect and catch leaked electrolyte.

FIG. 8 is a diagrammatic view of one embodiment of the invention 80, where a common commercial battery 100b is seated in a holder/shelf 70 fitted with a sensor 20 to detect and collect leaked electrolyte. The circuit for the battery has a switch 72 and a resistance 74. The circuit for the system includes a detection actuating switch 76, and an informational device 302 comprised of an electrical value or measurement interpretation microcontroller and an indicator such as, for example, a visual indicator (e.g., a liquid crystal display), a light source such as an LED, a luminescent strip, an electroluminescent lamp, an incandescent bulb or neon light, and an audible alarm such as a buzzer or a beeper. When switch 76 is closed detection can be activated regardless whether switch 72 is open or closed.

An exemplary method for detecting that electrolyte has leaked from a battery having cells or monoblocks can comprise the following steps: providing a battery, if not already present, with a sensor comprised of a sheet-like layer having a conductive surface that is an electrically conductive path to leaked electrolyte and an electrical connection to a first interface, where the conductive surface is in contact with an insular wall of the battery that retains the cell's or monoblock's electrolyte. The sensor substantially blankets the insular wall such that if there is a leak of the electrolyte it intersects the conductive surface. Then, measuring the electrical values or measurements between the first interface and either a positive or a negative terminal of the battery to confirm that there is substantially no electrical connection between the first interface and either of the terminals as indicated by a very high resistance; and monitoring periodically that no electrical connection exists therein affirming that there has been no leakage of electrolyte, nor that a new electrical connection has been created between the first interface and either of the terminals, nor that there is an electrical path from the sensor through the wall to the terminals.

Another exemplary method can include the steps of: providing the battery with a case; providing the sensor with an electrically and physically insulating layer between the conductive surface and the battery's case, and a first external communication point in electrical connection with the first interface; and testing to confirm that there is not a conductive pathway from either terminal to the battery case. The method can additionally comprise the step of: providing an absorbent material that collects leaked electrolyte.

Another exemplary method for detecting that electrolyte has leaked from a battery can comprise the step of adapting the battery with the sensor. The adapting step preferably comprises the steps of: determining the bottom and side surface area dimensions and shape of an insular wall of the battery that retains the cell's or monoblock's electrolyte; fabricating a sensor comprised of a sheet-like layer having a conductive surface that is an electrically conductive path to leaked electrolyte and an electrical connection to a first interface, where the sheet-like layer has a shape and surface area that is approximately the same as the bottom surface area dimensions and shape of the battery; positioning the battery in contact with the conductive surface of the sheet-like layer and all layers of the sensor are fabricated of materials selected to be resistive to corrosion by the leaked electrolyte; and measuring the electrical values or measurements between the first interface and either a positive or a negative terminal of the battery to confirm that there is substantially no electrical connection between the first interface and either of the terminals.

The shape and surface area of the sheet-like layer can be inclusive of side surface area dimensions and shape of a battery, as well as a bottom side of the battery. It should be further noted that in all embodiments discussed herein, the term "sheet-like layer", "sleeve-like" or "pad-like" can refer to a liquid permeable conductive layer or structure as well as a non-liquid permeable conductive layer or structure used in cases such as, for example, where an absorptive pad is between the sheet-like layer and battery which contains electrolyte and the absorptive pad is used to contain leaked electrolyte. A battery can be positioned in contact with a bottom and side conductive surface of the sheet-like layer as described above.

It is to be understood that the foregoing description and specific embodiments are merely illustrative of the best mode of the invention and the principles thereof, and that various modifications and additions may be made to the invention by those skilled in the art, without departing from the spirit and scope of this invention, which is therefore understood to be limited only by the scope of the appended claims.

What is claimed is:

1. A leak detection system comprising:
    a first structure adapted to contain a liquid or a liquid storage structure used in an energy storage system, said first structure further comprising an electrical terminal section that extends through said first structure;
    a second structure placed in proximity to a surface of said first structure;
    a first conductor coupled to a first area of said second structure; and
    a sensing system adapted to sense a change in at least one electrical value or measurement associated with a leak state electrical path that includes at least one area of said second structure and said liquid in an interior portion of said first structure, said sensing system is coupled to said first conductor and said electrical terminal section;
    wherein said second structure is adapted such that said electrical value or measurement will change when at least some of said liquid comes in contact with said second structure;
    wherein said leak state electrical path comprises an electrical path between said electrical terminal section and said liquid which is completed when a breach occurs in a portion of said first structure which permits said liquid to pass through said first structure.

2. A system as in claim 1, wherein said first structure is a battery.

3. A system as in claim 1, wherein said second structure comprises a sleeve or a pad structure adapted to conform to at least one portion of an outer surface of said first structure.

4. A system as in claim 1, wherein said sensing system is a multimeter, a resistance sensing device, a voltage sensing device, a current sensing device or a device adapted to determine changes in electrical values or measurements and output a signal when such a change is detected.

5. A system as in claim 1, wherein said second structure comprises at least one conductive layer.

6. A system as in claim 1, wherein said second structure comprises at least one conductive layer and a liquid permeable layer, said liquid permeable layer is adapted to absorb at least some of said liquid, wherein said conductive layer is at least partially liquid permeable.

7. A system as in claim 6, wherein said liquid permeable layer has a first electrical value until a sufficient quantity of said liquid permeates said liquid permeable layer to determine that said liquid is leaking.

8. A system as in claim 1, wherein said second structure comprises a plurality of conductive members.

9. A system as in claim 1, wherein said sensing system is adapted to output a signal if said electrical path is detected.

10. A system as in claim 1, wherein said sensing system is adapted to determine a quantity value associated with said liquid which has leaked from said first structure based on a change in at least one said electrical value in said second structure after said liquid has come in contact with said second structure.

11. A system as in claim 1, further comprising a computer processor and a network bus adapted to receive outputs from said sensing system.

12. An electrolyte detection system comprising:
a battery with an insular wall that retains electrolyte contained in one or more cells or monoblocks, a positive terminal, a negative terminal, and an insular case that houses the battery;
a sensor that detects leaked electrolyte, where leaked electrolyte is electrolyte that is no longer in the one or more cells or monoblocks, said sensor, being substantially flush to the wall, contacting the leaked electrolyte substantially as it leaks out of the one or more cells or monoblocks, where said sensor comprises a sheet-like layer having a surface that is an electrical conductive path for the leaked electrolyte and an electrical connection to a first interface; and
a first external communication point in electrical communication with the first interface, where in the absence of leaked electrolyte there is substantially no electrical connection between the first external communication point and either of the terminals through said insular wall, and in contrast where leaked electrolyte is present there is an electrical connection between the first external communication point and either of the terminals through said insular wall.

13. The electrolyte detection system according to claim 12, wherein said sheet-like layer is selected from the group consisting of a foil sheet, layer, perforated foil sheet, a mesh, a grid of wires, a conductive pad, and a combination thereof.

14. The electrolyte detection system according to claim 12, further comprising a device for measuring the electrical values or measurements between the first external communication point and either of the terminals.

15. The electrolyte detection system according to claim 14, wherein said device for measuring the electrical values or measurements is a multimeter.

16. The electrolyte detection system according to claim 12, wherein said sensor is fabricated of materials selected to be resistive to corrosion by the leaked electrolyte.

17. The electrolyte detection system according to claim 14, wherein said device is a member of a network.

18. The electrolyte detection system according to claim 12, further comprising a second external communication point in electrical communication with one of the terminals and an electrical circuit device in electrical communication with the first and second external communication points through a switch when closed.

19. The electrolyte detection system according to claim 18, wherein the electrical circuit device is an informational device comprised of an electrical values or measurements interpretation microcontroller and an indicator selected from the group consisting of a visual indicator, such as a liquid crystal display, a light source such as an LED, a luminescent strip, an electroluminescent lamp, an incandescent bulb or neon light, and an audible alarm such as a buzzer or a beeper.

20. The electrolyte detection system according to claim 18, wherein the electrical circuit device is a transmitter that communicates readings to a digital device that calculates the electrical values or measurements and thereby measures the electrical values or measurements and the presence or absence of leaked electrolyte.

21. The electrolyte detection system according to claim 12, wherein said sensor further comprises an absorbent material that collects leaked electrolyte.

22. An electrolyte detection system, said system comprising:
a battery with an insular wall that retains electrolyte contained in one or more cells or monoblocks, a positive terminal, a negative terminal, and a conductive case that houses the battery;
a sensor that detects leaked electrolyte, where leaked electrolyte is electrolyte that is no longer in the one or more cells or monoblocks, said sensor, being substantially flush to the wall, contacting the leaked electrolyte as it leaks out of the one or more cells or monoblocks, where said sensor comprises a sheet-like layer having a surface that is an electrical conductive path to the leaked electrolyte and an electrical connection to a first interface, and further comprises an electrically and physically insulating layer between the conductive surface and the battery's conductive case; and
a first external communication point in electrical communication with the first interface, where in the absence of leaked electrolyte there is substantially no electrical connection between the first external communication point and either of the terminals through said insular wall, and in contrast where leaked electrolyte is present there is an electrical connection between the first external communication point and either of the terminals through said insular wall.

23. The electrolyte detection system according to claim 22, wherein said sensor further comprises an absorbent material that collects leaked electrolyte.

24. The electrolyte detection system according to claim 22, wherein said sheet-like layer is selected from the group consisting of a foil sheet, layer, perforated foil sheet, a mesh, a grid of wires, a conductive pad, and a combination thereof.

25. The electrolyte detection system according to claim 22, further comprising a device for measuring the electrical values or measurements between the first external communication point and either of the terminals.

26. The electrolyte detection system according to claim 25, wherein said device for measuring the electrical values or measurements is a multimeter.

27. An electrolyte detection system, said system comprising:
a battery with an insular wall that retains electrolyte contained in one or more cells or monoblocks, a positive terminal, a negative terminal, and a case that houses the battery;
a plurality of corresponding sensors that detect leaked electrolyte, where leaked electrolyte is electrolyte that is no longer in the one or more cells or monoblocks, where a corresponding sensor is substantially flush to at least a portion of the wall at a defined location, contacting the leaked electrolyte substantially as it leaks out of the one or more cells or monoblocks, where each corresponding sensor comprises a sheet-like layer having a surface that is an electrical conductive path to the leaked electrolyte and an electrical connection to a first interface; and
a plurality of first external communication points, where a point is in electrical communication with the first interface of the corresponding sensor, where in the absence of leaked electrolyte there is substantially no electrical connection between any of the first external communication points and either of the terminals through said insular wall, and in contrast where leaked electrolyte is present there is an electrical connection between one or more of the first external communication points for the corresponding sensor and either of the terminals through said insular wall, where each corresponding sensor having the electrical connection identifies the defined location on the wall where electrolyte has breached the wall of the battery.

28. The electrolyte detection system according to claim 27, wherein said system further comprises an electrically and physically insulating layer between the conductive surface and the battery's case.

29. The electrolyte detection system according to claim 27, further comprising a second external communication point in electrical communication with one of the terminals and an electrical circuit device in electrical communication with the first and second external communication points through a switch when the switch is closed.

30. The electrolyte detection system according to claim 29, wherein the electrical circuit device is an informational device comprised of an electrical values or measurements interpretation microcontroller and an indicator selected from the group consisting of a visual indicator, such as a liquid crystal display, a light source such as an LED, a luminescent strip, an electroluminescent lamp, an incandescent bulb or neon light, and an audible alarm such as a buzzer or a beeper.

31. A method for detecting that electrolyte has leaked from a battery having cells or monoblocks, said method comprising the steps of:
    providing the battery, if not already present, with a sensor comprised of a sheet-like layer having a conductive surface that is an electrically conductive path for leaked electrolyte and an electrical connection to a first interface, where the conductive surface is in contact with an insular wall of the battery that retains the cell's or monoblock's electrolyte, said sensor substantially blanketing the insular wall such that if there is a leak of the electrolyte, the leaked electrolyte intersects the conductive surface;
    measuring the electrical values or measurements between the first interface and either a positive or a negative terminal of the battery to confirm that there is substantially no electrical connection between the first interface and either of the terminals through said insular wall; and
    monitoring periodically that no electrical connection exists therein confirming that there has been no leakage of electrolyte, or finding that a new electrical connection has been created between the first interface and either of the terminals through said insular wall, thereby detecting that electrolyte has leaked, and created an electrical path from the sensor through the wall to the terminals.

32. The method according to claim 31, further comprised of the steps of:
    providing the battery with a case;
    providing the sensor with an electrically and physically insulating layer between the conductive surface and the battery's case, and a first external communication point in electrical connection with the first interface; and
    testing to confirm that there is not a conductive pathway from either terminal to the battery case.

33. The method according to claim 31, further comprised of the steps of:
    providing an absorbent material that collects leaked electrolyte.

34. The method according to claim 31, further comprised of the step of:
    adapting the battery with the sensor.

35. The method according to claim 34, wherein the adapting step comprises the steps of:
    determining the bottom and side surface area dimensions and shape of an insular wall of the battery that retains the cell's or monoblock's electrolyte;
    fabricating a sensor comprised of a sheet-like layer having a conductive surface that is an electrically conductive path to leaked electrolyte and an electrical connection to a first interface, where the sheet-like layer has a shape and surface area that is approximately the same as the bottom surface area dimensions and shape of the battery;
    positioning the battery in contact with the conductive surface of the sheet-like layer; and
    measuring the electrical values or measurements between the first interface and either a positive or a negative terminal of the battery to confirm that there is substantially no electrical connection between the first interface and either of the terminals.

36. A method of manufacturing an electrolyte detection system comprising:
    forming a battery with an insular wall that retains electrolyte contained in one or more cells or monoblocks, a positive terminal, a negative terminal, and an insular case that houses the battery;
    providing a sensor that detects leaked electrolyte, where leaked electrolyte is electrolyte that is no longer in the one or more cells or monoblocks, said sensor, being substantially flush to the wall, contacting the leaked electrolyte substantially as it leaks out of the one or more cells or monoblocks, where said sensor comprises a sheet-like layer having a surface that is an electrical conductive path for the leaked electrolyte and an electrical connection to a first interface; and
    providing a first external communication point in electrical communication with the first interface, where in the absence of leaked electrolyte there is substantially no electrical connection between the first external communication point and either of the terminals through said insular wall, and in contrast where leaked electrolyte is present there is an electrical connection between the first external communication point and either of the terminals through said insular wall.

37. A leak detection system as in claim 1, wherein said first structure is a multi-celled battery structure.

38. A leak detection system as in claim 1, wherein said first structure is a single electrochemical cell structure.

39. A leak detection system as in claim 1, wherein said first structure is an enclosure containing one or more battery structures which have their own case structure to separate said liquid from contact with said first structure.

40. A leak detection system as in claim 1, wherein said first structure is a monoblock type battery.

41. A leak detection system as in claim 1, wherein said at least one electrical value or measurement associated with said leak state electrical path comprises an electrical current.

42. An electrochemical energy storage device leak detector comprising:
    a first terminal, said first terminal adapted to be coupled to a corresponding electrode of a battery;
    a second terminal, said second terminal adapted to be disposed adjacent to a case of said battery; and a detector, said detector being coupled between said first terminal and said second terminal, said detector being adapted to detect an electrical current, said electrical current flowing in series through said second terminal and said corresponding electrode of the battery and through a leaked fluid of said battery while bypassing a second electrode of said battery.

43. An electrochemical energy storage device leak detector as in claim 42, further comprising a sensor comprised of a conductive sheet-like layer coupled to said second terminal and disposed adjacent to said case of said battery.

44. An electrochemical energy storage device leak detector as in claim 43, wherein said sheet-like layer is selected from the group consisting of a foil sheet, layer, perforated foil sheet, a mesh, a grid of wires, a conductive pad, and a combination thereof.

45. An electrochemical energy storage device leak detector as in claim 43, further comprising an insulating layer disposed adjacent to said sheet-like layer.

46. An electrochemical energy storage device leak detector as in claim 42, wherein said battery comprises a single cell.

47. An electrochemical energy storage device leak detector as in claim 42, wherein said battery comprises more than one cell.

48. An electrochemical energy storage device leak detector as in claim 42, further comprising an informational device comprised of an electrical values or measurements interpretation microcontroller and an indicator selected from the group consisting of a visual indicator, such as a liquid crystal display, a light source such as an LED, a luminescent strip, an electroluminescent lamp, an incandescent bulb or neon light, and an audible alarm such as a buzzer or a beeper, said informational device is coupled to said measuring device and said second terminal.

* * * * *